United States Patent

[11] 3,623,039

[72] Inventor James E. Barham
5151 Buffalo Ave., Sherman Oaks, Calif. 91403

[21] Appl. No. 35,829
[22] Filed May 8, 1970
[45] Patented Nov. 23, 1971

[54] MAGNETIC TAPE SYSTEM HAVING MARK CODE IN THE FORM OF COINCIDENT ABSENCE OF CLOCK AND PRESENCE OF DATA PULSES
10 Claims, 7 Drawing Figs.

[52] U.S. Cl. .......... 340/174.1 J, 179/100.2 S, 340/174.1 G, 340/174.1 H
[51] Int. Cl. .......... G11b 27/30, G11b 23/36
[50] Field of Search .......... 340/174.1 A, 174.1 G, 174.1 H, 174.1 J; 179/100.2 S

[56] References Cited

UNITED STATES PATENTS

| | | | |
|---|---|---|---|
| 2,782,398 | 2/1957 | West et al. | 179/100.2 S |
| 2,900,132 | 8/1959 | Burns, Jr. et al. | 340/174.1 J |
| 2,907,005 | 9/1959 | Chien et al. | 340/174.1 J |

*Primary Examiner*—Terrell W. Fears
*Assistant Examiner*—L. Russell Goudeau
*Attorney*—Nilsson, Robbins, Wills & Berliner

ABSTRACT: A recording system is disclosed for use in conjunction with a recording medium, e.g. magnetic tape, wherein the tape carries at least a clock channel and one data channel, and wherein data is defined in discrete sections along the length of medium. The system locates the sections by "-mark" codes which precede each section and are followed by addresses that identify the sections. An absence of signals in the clock channel over a predetermined length of tape is one element of a "mark" code. The other element is provided by a coincident predetermined code signal in the data channel.

INVENTOR.
JAMES E. BARHAM.
BY
Nilsson, Robbins, Wills & Berliner
Attorneys.

INVENTOR
JAMES E. BARHAM
BY
Nilsson, Robbins, Wills & Berliner,
Attorneys

MAGNETIC TAPE SYSTEM HAVING MARK CODE IN THE FORM OF COINCIDENT ABSENCE OF CLOCK AND PRESENCE OF DATA PULSES

BACKGROUND AND SUMMARY OF THE INVENTION

Magnetic tape has come into widespread use for recording digital data signals as well as almost any form of intelligence reducible to an electrical signal. Of course many different forms of structures have been proposed for recording upon, and sensing magnetic tape with a variety of operating formats; however, one digital system which is in widespread use involves the provision of a clock channel on the tape along with at least one digital data channel. The clock signals are sensed to synchronize the data signals thereby accommodating speed variations in the magnetic tape.

Although the clock signals derived from a magnetic medium may identify the individual bits received upon the medium, additional structure is required to indicate the particular part of the medium or tape which is currently being scanned. That is, for example, the initial clock pulse at the beginning of the tape might coincide with an arbitrary position "one" with each adjacent pulse indicating a position of an increase of "one" in significance. Although such a technique has been proposed in the past, in using such an arrangement for extended lengths of tape, rather large counters would be required, along with rather complex detection apparatus. Accordingly, a need exists for a simplified system of locating a specific section of a considerably length of magnetic tape.

In addition to the system considered above, it has also been proposed to identify the sections of a magnetic tape with physical markers. For example, it has been proposed to provide windows along the length of a magnetic tape which could be sensed, as by an electro-optical apparatus, to drive a counter for manifesting the instant position of the tape in relation to the sensing or recording heads. Metal slugs and other markers have also been used in that manner. Although systems of this type have been effective in certain applications, such systems tend to be rather complex in their requirement for different types of transducers to sense the tape. Accordingly, these systems have not completely satisfied the needs of simplicity and economy.

In general, the present system defines and locates specific sections of a tape by sensing a predetermined "mark" code signal carried jointly in a clock channel and at least one data channel to indicate a "mark" location. A numerical address is provided contiguous to each "mark" location so as to identify the specified section of the tape that is positioned with relation to the transducer heads. The system locates addresses (by "-mark" code signals) then tests such addresses for coincidence with the desired address. On occurrence of coincidence the desired section of tape is indicated to have been located.

BRIEF DESCRIPTION OF THE DRAWINGS

In the drawings, which constitute a part of this specification, an exemplary embodiment demonstrating various objectives and features hereof is set forth; specifically.

DESCRIPTION OF THE ILLUSTRATIVE EMBODIMENT

As required, a detailed illustrative embodiment of the invention is disclosed herein. However, it is to be understood that the specific embodiment merely exemplifies the invention which may be embodied in many forms that are radically different from the illustrative embodiment as disclosed. Therefore, the specific structural and functional details disclosed herein are not to be interpreted as limiting, but merely as a basis for the claims defining the scope of the invention.

Figure 1:
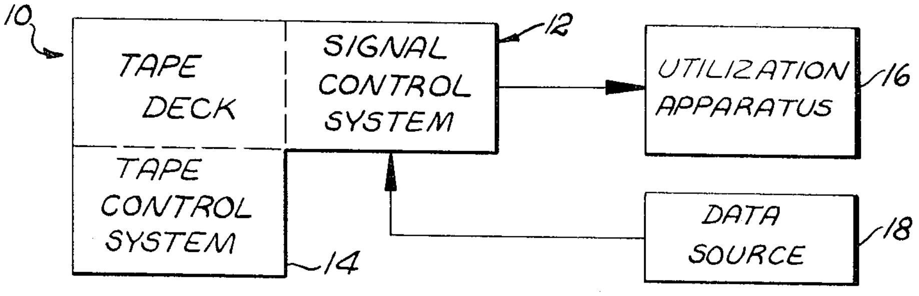
FIG. 1 is a block diagram generally representative of the system incorporating the present invention.

Referring initially to FIG. 1, there is shown a tape section 5 including a tape deck 10, as generally well known in the prior art. The tape deck 10 includes apparatus for physically moving magnetic tape (not shown) in relation to transducer heads (not shown). The tape deck 10 is somewhat integrally related with a signal control system 12 and a tape control system 14. That is, the tape system 5 specifically includes not only the structure for reeling and moving magnetic tape under the control of the tape control system 14 but additionally incorporates the system 12 for controlling the flow of electrical signals to and from the magnetic tape. Tape systems incorporating control systems exist in a variety of specific structural forms which may be employed as the tape system 5 as shown in FIG. 1.

The signal control system 12 is connected to provide signals to a utilization apparatus 16 and to receive signals from a data source 18. The utilization apparatus 16 may take a wide variety of forms including nearly any structure which utilizes or employs signals from a magnetic tape or other recording medium. Somewhat similarly, the data source 18 may also vary widely to include nearly any form of structure for supplying signals to be recorded on tape by the tape system 5.

As disclosed in detail below, the system 5 incorporates apparatus for recording a "mark code on the tape and additionally structure for sensing the appearance of such a "mark" code to identify the current scanning location on the tape. The system utilizes a format for recording on the tape which will be considered preliminary to the detailed structure.

Figure 2:
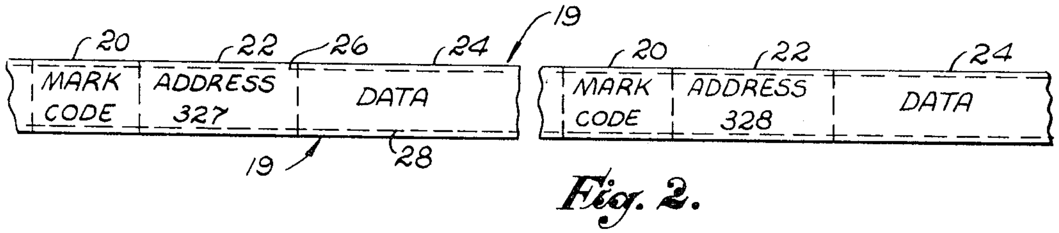
FIG. 2 is a plan view of a section of magnetic tape with a recording format visably indicated that is illustrative of that utilized by the structure of the present invention.

As shown in FIG. 2, a length of tape 19 carries a recurring format pattern of: "mark," "address," and "date." Specifically, the "mark" code portions 20 of the tape precede address portions 22 in order to designate the contents of such portions as addresses. The data sections 24 of the tape follow the address portions and contain data which is identified by the preceding address.

In the operation of the system, assume for example the desire to locate the data identified by an address numerically designated as 327 (FIG. 2). Accordingly, the tape 19 is scanned, in the first instance searching for "mark" code portions 20. The occurrence of each such "mark" code conditions the system to process the immediately following portions as an address. Accordingly, the tape is scanned until the address 327 is located at which the location, the desired information or data is indicated to be available in the next data section 24.

In the system hereof, the tape 19 carries at least two tracks or channels, including a clock track 26 and a data track 28, as indicated by dashed lines on the tape 19. Of course, such tracks are not humanly perceptible; however, they are defined on the tape 19 in accordance with the operating system thereof.

Figure 3:
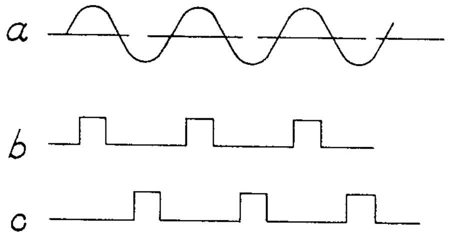
FIGS. 3, 4 and 7 show waveforms of electrical signals utilized within the system as disclosed herein.

The "mark" code, contained in the portions 20 of the tape, involves both the clock track 26 and the data track 28. As a further preliminary consideration the signal format employed herein will be made with reference initially to FIG. 3.

Assuming a substantially uniform oscillating signal is recorded on the clock track of the tape 19, sensing such a track will produce a signal substantially as shown by the waveform of FIG. 32, i.e. a rectangular sinusoid. Such a waveform is processed herein to define two separate trains of positive pulse associated respectively with the positive-going and the negative-going portions of the sine wave. That is, as shown by the waveform of FIG. 2*b*, each positive portion of the waveform of FIG. 3*a* produces a substantially uniform positive-going pulse. Somewhat similarly, each negative-going portion of the sine wave of FIG. 3*a*, produces a regular positive-going pulse as shown in FIG. 3*c*. Of course, the pulses in the trains represented by the waveforms of FIGS. 3*b* and 3*c* are offset in staggered phase relationship. This technique for processing detected signals is utilized by the apparatus disclosed herein in processing both signals from the clock track and from the data track.

Figure 4:
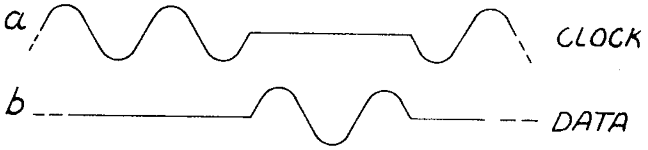

Referring now to FIG. 4, the "mark" code format is illustrated. That is a coded "mark" is manifest by the concurrence of a discontinuity in the clock signal, as indicated in the waveform of FIG. 4*a*, in coincidence with approximately 1½ cycles in the data track. The concurrence of an absence of clock signals along the line predetermined signal in the data channel is detected to indicate a "mark" and further to indicate that the next-following data sensed from the tape is an address designating the next-following section of the tape.

In the operation of the system hereof, a great length of tape may be provided with the recurring pattern as shown in FIG. 2. The data section 24 may carry information in any recorded forms, e.g. digital, analog, etc. As indicated above, a predetermined data section 24 is located by identifying the address recorded in the address portion 22 of the tape. Specifically, the tape 19 is moved past transducer heads and upon each sensing of a "mark" code the following address portion 22 is sensed and compared with the desired address. Upon sensing a coincidence, the desired position is attained.

Figure 5:
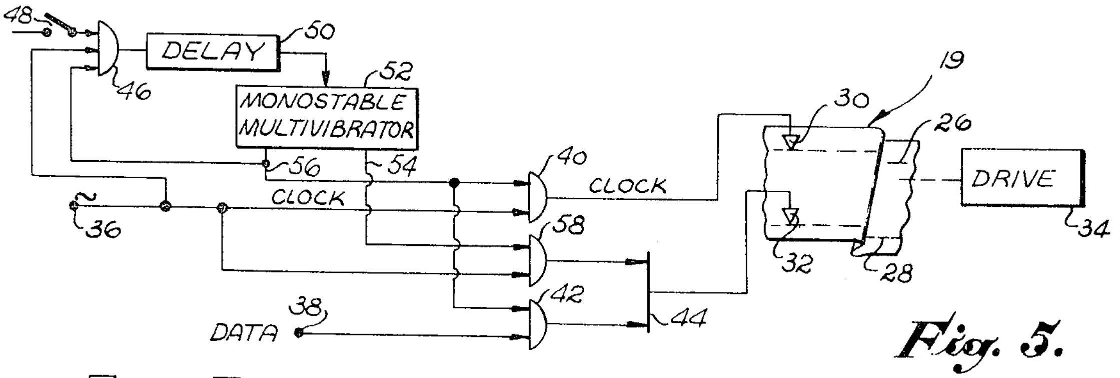
FIG. 5 is a block and schematic diagram of one portion of the system of FIG. 1 shown in greater detail.

In view of the above preliminary consideration of the system, reference will now be made to FIG. 5 showing that portion of the system 5 (FIG. 1) which serves to record the coded "mark" signals on the tape 19, a small fragment of which is shown. Signals are recorded upon the tape 19 by a clock head 30 and a data head 32. Such heads are very well known in the prior art and may be multiple purpose units and in that regard may also be associated with various forms of amplifiers and pulse shapers as well known in the prior art which are not shown in detail herein in the interests of simplicity.

During normal recording operations, the tape 19 is moved relative to the heads 30 and 32 by a tape drive 34 which is incorporated in the system 5 (FIG. 1). During intervals of recording, a clock signal from an oscillator (not shown) as well know in the prior art, is applied at a terminal 36 while data signals are applied at a terminal 38. The signals from the terminals 36 and 38 pass through normally qualified AND-gates 40 and 42 respectively for application to the heads 30 and 32. It is to be noted that the data signals also pass through an OR-connection-gate 44 which simply couples the output from the AND-gate 42 to the head 32. Operation is thus, except when recording a "mark" code.

To accomplish a "mark" code on the tape 19, and AND-gate 46 (upper left) is qualified, for example manually by the closure of a switch 48 or by an external control signal. The gate 46, when qualified passes the next-received clock pulse from the terminal 36 which results in the application of a pulse to a delay circuit 50 to establish the timing of the clock signal precisely at a zero-crossing. At that time, the delay circuit 50 actuates a monostable multivibrator 52 providing a high output in a conductor 54 and a low output in a conductor 56. As a result, the gate 46 is disqualified along with the gates 40 and 42; however, and AND-gate 58 is qualified for the passage of clock signals from the terminal 36 through the OR-gate 44 to the data-recording head 32. As a consequence, no recording takes place in the clock track 26 for a 1½ cycle interval; however the clock signal is recorded on the data track 28. The interval of the monostable multivibrator 52 is precisely 1½ cycles of the clock pulse with the result that the AND-gates 46, 40 and 42 are inhibited for precisely 1½ cycles of the clock signal, during which interval the gate 58 is qualified. Thus, the clock track 26 records no signals for a space of 1½ cycles with the data track records 1½ cycles of the clock pulse with the result that the AND-gates 46, 40 and 42 are inhibited for precisely 1½ cycles of the clock signal, during which interval the gate 58 is qualified. Thus, the clock track 26 records no signals for a space of 1½ cycles while the data track records 1½cycles of the clock signal.

In view of the fact that the drive 34 ideally motivates the tape 19 at a constant speed during an particular recording or sensing operation, the relationship between time and tape length may be assumed to be substantially constant for purposes of simplicity in explaining and understanding the present invention. However, obviously, in some forms hereof that relationship may be varied as well known in the prior art. In any event, in accordance with the system hereof, "mark" code signals are established at desired locations along a length of tape 19 which is to be used in association with the system hereof. Furthermore, the "mark" codes take a specific form wherein the clock track is void of recorded signals while the data track contains a predetermined code signal, e.g. 1½ cycles of sinusoidal waveform initiated by a positive-going path cycle.

The address signals and data may be provided in the address portions 22 and the data section 24 by passage through the signal control system 12 as indicated in FIG. 1, and specifically through gates 40 and 42. Various techniques for developing and applying such signals are very well known in the prior art.

Figure 6:
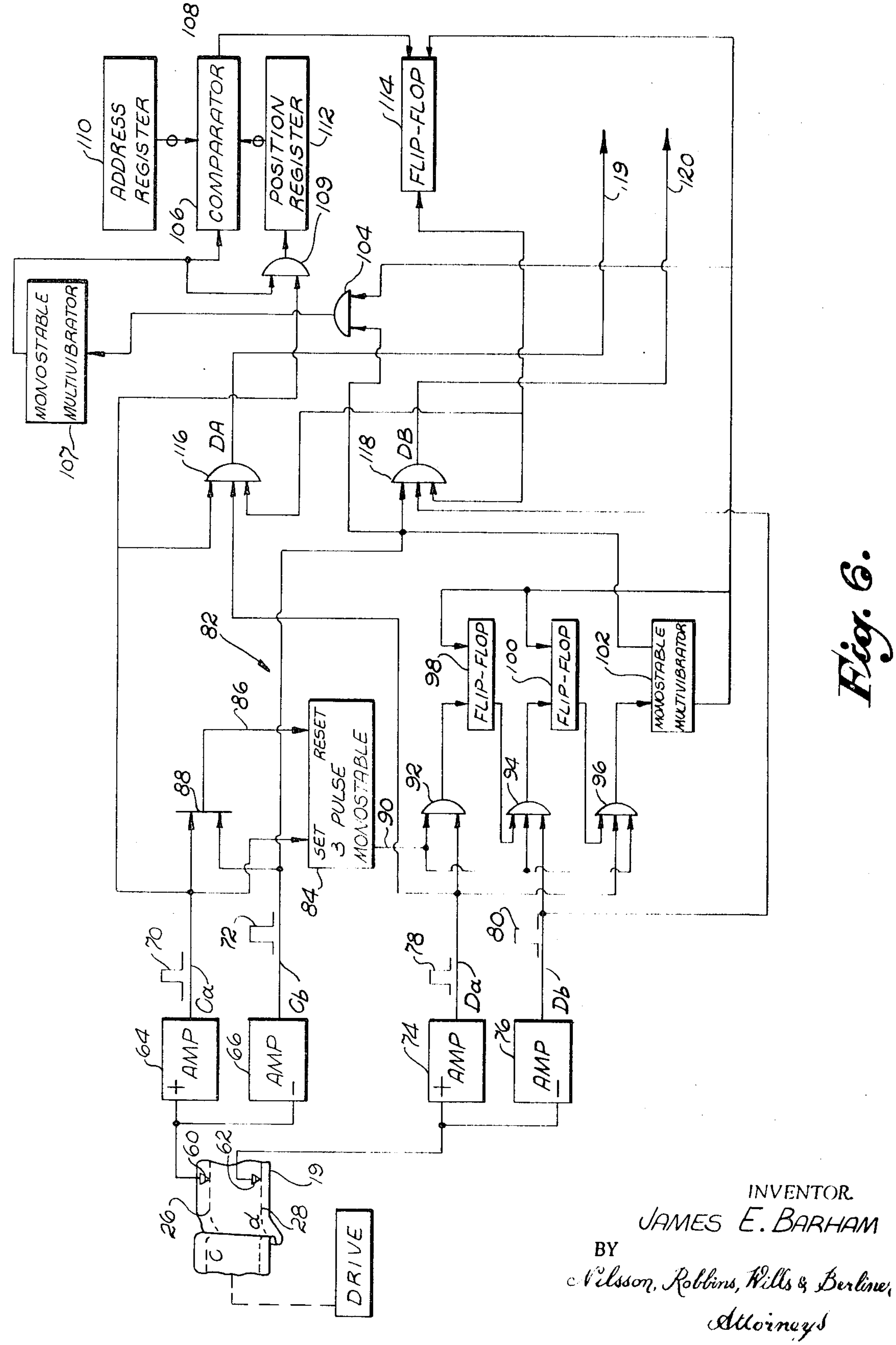
FIG. 6 is a block and schematic diagram of another portion of the system of FIG. 1 shown in greater detail.

Considering now the operation of the system hereof to sense the 19 magnetic tape, and locate a predetermined section thereof, reference will now be had to FIG. 6. A fragment of the tape 19 is indicated and includes a representation of the clock track 26 and the data track 28. Transducer heads 60 and 62 for sensing clock signal c and data signals d are also represented in FIG. 6 and may be independent or embodied in the heads 30 and 32 as previously described with reference to FIG. 5.

The head 60 (communicating with the clock track 26) provides sensed signal *c* to amplifiers 64 and 66 in accordance with techniques in widespread use for sensing magnetic tape. The amplifier 64 has a positive input and incorporates a pulse shaper as well known in the prior art to provide a signal $C_a$ including pulses 70 from the positive-going portion of the sensed signal substantially as graphically represented in FIG. 3*b*. Somewhat similarly, the amplifier 66 has a negative input and provides a signal $C_b$ including positive-going pulses 72 that are derived from the negative-going portion of the sensed sinusoidal signal as depicted in FIG. 3*c*. Accordingly, the amplifiers 64 and 66 provide signals $C_a$ and $C_b$ including time-spaced pulses 70 and 72 respectively, which are representative of the positive and negative half cycles of the sensed sinusoidal signal.

Somewhat similar to the structure described above there is associated with the clock track 26, a pair of amplifiers 74 and 76 connected to the head 62 for operation with the data track 28. Specifically, the amplifier 74 has a positive input and provides a signal $D_a$ including data pulses 78 while the amplifier 76 has a negative input and provides a signal $D_d$ including spaced-apart data pulses 80.

Figure 7:
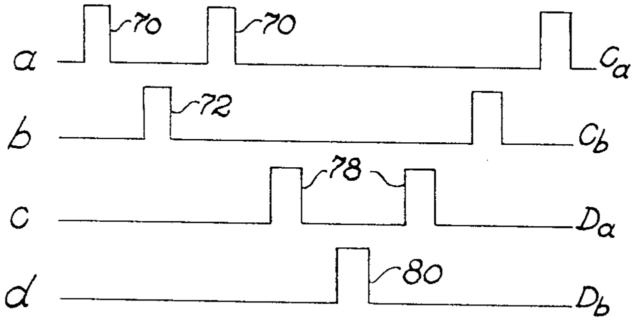

The signals $C_a$, $C_d$, $D_a$ and $D_b$ are applied to a logic network 82 as generally indicated in FIG. 6. The function of the logic network 82 is to detect the "mark" codes in order to indicate that the next-following signals represent an address identifying a specific section of data. As indicated above, the detection of a "mark" code involves sensing a specific signal format existing concurrently in the clock track 26 and the data track 28. The format of that code is indicated in FIG. 4 and when converted to the signal forms as explained above produces a pulse format as indicated in FIG. 7. Specifically, the waveform of FIG. 7*a* (signal $C_a$, shows the pulses 70 in time relationship with the pulses 72 (signal $C_b$, as depicted in the waveform of FIG. 7*b*. The pulses 78 (signal $D_a$) are depicted in the waveform of FIG. 7*c* in time relationship with the pulse 80 (signal $D_b$) as depicted in FIG. 7*d*.

Each concurrence of a pulse 70 occuring in the signal $C_a$ serves to set a monostable multivibrator 84 which may be reset by the mere passage of time or by the occurrent of a pulse in an input conductor 86. The conductor 86 is connected to receive either pulses 70 or 72 through an OR-gate 88. However, as indicated, if no such pulse is received, the monostable multivibrator 84 will automatically reset after precisely 1 ½ cycles of the clock signal.

The monostable multivibrator 84 has a binary output to a conductor 90 which is high when the multivibrator is set and which is applied to each of a set of AND-gates 92, 94 and 96. The AND-gates 92 and 94 are connected respectively to flip flops 98 and 100 while the AND-gates 96 is connected to a monostable multivibrator 102.

In view of the above preliminary description of the network 82, the operation thereof may now be best understood by assuming the occurrence of a "mark" code from the tape 19, and explaining the operation of the network 82 to manifest such an occurrence by setting a monostable multivibrator 102. Additional structural components will be identified as the explanation proceeds.

The initial occurrence in the "mark" code is the appearance of a pulse 70 in the signal $C_a$, as indicated in FIG. 7. The pulse 70 is applied to set the monostable multivibrator 84 thereby providing a high binary output in the conductor 90 to qualify each of the AND-gates 92, 94 and 96 unless another pulse 70 or a pulse 72 is received, the monostable multivibrator 84 is set for precisely 1½cycles of the clock and then automatically resets. The function of the monostable multivibrator 52 is to define the period when the clock track 26 must contain no signals (in accordance with the "mark" code) during which period the data track 28 must provide signals as indicated by the waveforms of FIG. 4b to in turn develop signals as indicated by the waveforms of FIGS. 7c and 7d.

It is to be noted that in the event any pulses occur from the clock track 26 during the interval when the monostable multivibrator 84 is set, such pulses are supplied through the OR-gate 88 and the connector 86 to reset the monostable multivibrator 84 and terminate any consideration of the instant signal pattern as a "mark" code. However, while the monostable multivibrator 84 is set, the gates 92, 94 and 96 remain qualified and these gates must be qualified to conclude the detection of a "mark" signal.

With the gates 92, 94 and 96 qualified, the "mark" code is detected upon the occurrence of the pulses 78 and 80 as shown in the waveform of FIGS. 7c and 7d. The first pulse 78 in the sequence is produced from the amplifier 74 and is applied to the AND-gate 92 (FIG. 6). With the qualification of the AND-gate 92 (by the monostable multivibrator 84 and the pulse 78) the flip flop 98 is set to provide an output which qualifies the AND-gate 94. Accordingly, with the AND-gate 94 so qualified, the following pulse 80 results in the flip flop 100 being set. The concluding element of the data channel manifesting a "mark" code is another pulse 78 which completes qualification of the gate 96 to pass a pulse and set a monostable multivibrator 102.

The output from the multivibrator 102 in its set state, resets the flip flops 98 and 100 and qualifies and AND-gate 104 which is connected to receive the pulses 72. The monostable multivibrator 102 has a very short duration specifically, less than a full cycle of the clock. Accordingly, unless the initial pulse or signal from the clock track 26 is a pulse 72 (applied to the gate 104) the monostable multivibrator 102 is reset before the occurrence of such a pulse, again rejecting the signals as a "mark" code.

When the "mark" code is proper (the first occuring pulse being a pulse 72) the gate 104 is fully qualified to set a monostable multivibrator 107 which has a period sufficient to accommodate the passage of an address into a position register 112. Specifically, the full qualification of the AND-gate 104 sets the monostable multivibrator 107 to qualify an AND-gate 109 and operate a comparator 106. The multivibrator 107 provides a high output during the period while the "address" signals are sensed from the tape and passed into the position register 112 for comparison with the contents of the address register 110.

The comparator 106 is a binary circuit as well known in the prior art and upon being so actuated, performs a comparison of two binary values which, when identical result in an output pulse to a conductor 108. Specifically, the comparator 106 receives parallel binary signals from an address register 110 and a position register 112. The address register holds the address sought while the position register 112 holds the address sensed from a portion 22 of the tape. Accordingly, upon receiving an actuate signal from the multivibrator 107, the comparator 106 compares the contents of the registers 110 and 112.

The operation of the comparator 106 upon detecting coincidence is to provide a pulse in the conductor 108 to a flip flop 114 which is set for an interval of time as desired to qualify gates 116 and 118 to pass the data elements under control of the clock signals. That is, the gate 116 when qualified by the output from the monostable multivibrator 114 passes data pulses 78 clocked by the clock pulses 70. Somewhat similarly, the gate 118 passes data pulses 80 clocked by the clock pulses 72. In the operation of the system, the flip flop 114 enables the provision of a continuing output from the data section of the tape of variable length and under control of the occurrence of a detection of another "mark" code, the flip flop 114 is reset terminating the flow of data to the output conductors 119 and 120.

Of course, the system hereof may take various other forms and formats which will be readily apparent to those skilled in the art. However, one of the important aspects of the system in the combination set forth resides in the structure wherein concurrent sensing of at least one clock track and one data track produce the "mark" code. Accordingly, such a format may be economically embodied in relatively inexpensive equipment and effectively used with the program of operation in which it becomes important to selectively locate desired data sections.

What is claimed is:

1. In a system for recording data, as on a magnetic medium, wherein data signals and clock signals are recorded in at least one data track and one clock track on said medium, and wherein data is defined in discrete sections along the length of said medium, which is sensed by movement relative to a sensing apparatus, the improvement for defining locations of said sections comprising:
   first means for sensing an absence of clock signals recorded in said clock track over a predetermined length of said medium, to provide a first signal;
   second means for sensing a predetermined signal in said data track coincidental with said predetermined length of said medium to provide a second signal; and
   means for indicating a defined section of said medium upon coincidence of said first and second signals.

2. A system according to claim 1 wherein said medium carries address signals for said sections and wherein said system further includes a desired address register, a position address register for receiving said address signals upon coincidence of said first and second signals and means to compare the contents of said address registers.

3. A system according to claim 2 further including control means for controlling the flow of said data signals, said control means being connected to be controlled by said means to compare.

4. A system according to claim 1 further including means for receiving signals sensed from each track of said tape to provide two separate signals.

5. A system according to claim 4 wherein said separate signals are each provided by said sensing apparatus including a first amplifier for providing pulses upon receiving positive-going signal variations and a second amplifier for providing pulses upon receiving negative-going signal variations.

6 A system according to claim 1 wherein said predetermined signal comprises 1½ cycles of said clock signal.

7. A system according to claim 1 further including means for recording said magnetic medium to accomplish an absence of clock signals in said clock track over a predetermined length of said medium and for recording a predetermined signal is said data track.

8. A system according to claim 7 wherein said medium carries address signals for said sections and wherein said system further includes a desired address register, a position address register for receiving said address signal upon coincidence of said first and second signals and means to compare the contents of said address registers.

9. A system according the claim 8 further including control means for controlling the flow of said data signals, said control means being connected to be controlled by said means to compare.

10. A system according to claim 9 further including means for receiving signals sensed from each track of said tape to provide two separate signals.

* * * * *